(12) United States Patent
Arpino (10) Patent No.: US 11,357,241 B2
(45) Date of Patent: Jun. 14, 2022

(54) CIRCULAR EQUIPMENT WITH AUTOMATIC UNMOLDING FOR POPSICLE PRODUCTION AND METHOD FOR POPSICLE PRODUCTION

(71) Applicant: Marino Arpino, Sao Paulo (BR)

(72) Inventor: Marino Arpino, Sao Paulo (BR)

( * ) Notice: Subject to any disclaimer, the term of this patent is extended or adjusted under 35 U.S.C. 154(b) by 367 days.

(21) Appl. No.: 16/625,265

(22) PCT Filed: Jun. 20, 2018

(86) PCT No.: PCT/BR2018/050201
§ 371 (c)(1),
(2) Date: Dec. 20, 2019

(87) PCT Pub. No.: WO2018/232481
PCT Pub. Date: Dec. 27, 2018

(65) Prior Publication Data
US 2020/0146310 A1 May 14, 2020

(30) Foreign Application Priority Data

Jun. 20, 2017 (BR) ...................... 10 2017 013361 3
Jun. 20, 2018 (BR) ...................... 10 2018 012612 1

(51) Int. Cl.
*A23G 9/10* (2006.01)
*A23G 9/08* (2006.01)
(Continued)

(52) U.S. Cl.
CPC ............... *A23G 9/10* (2013.01); *A23G 9/083* (2013.01); *A23G 9/18* (2013.01); *A23G 9/26* (2013.01);
(Continued)

(58) Field of Classification Search
CPC . A23G 9/10; A23G 9/083; A23G 9/18; A23G 9/26; A23G 9/503; A23G 9/14; A23G 2200/00; A23G 2200/12
See application file for complete search history.

(56) References Cited

U.S. PATENT DOCUMENTS 2,759,434 A * 8/1956 Hensgen .................. A23G 9/04
62/157
2,791,890 A * 5/1957 Gudmund ................ A23G 9/10
62/434
(Continued)

FOREIGN PATENT DOCUMENTS

GB 509411 A 7/1939
GB 1091492 A * 11/1967
(Continued)

OTHER PUBLICATIONS

International Search Report and Written Opinion, International Patent Application No. PCT/BR2018/050201, dated Sep. 10, 2018 with English translation of Search Report (15 pages).
(Continued)

*Primary Examiner* — Emmanuel E Duke
(74) *Attorney, Agent, or Firm* — Hamre, Schumann, Mueller & Larson, P.C.

(57) ABSTRACT

The equipment of the invention comprises a toroidal channel-shaped freezing tank containing coolant superimposed on a circular crown-shaped rotary mold holder, formed by a plurality of sectors affixed to the periphery of one traction disc driven by a stepper motor, said sectors having rectangular openings into which molds engage, whose lower portions are immersed in the coolant. At the bottom of the channel there is a rigid pipe provided with a plurality of holes through which jets of coolant are released under pressure. The popsicle release means comprise a radially oriented niche within said tank and a vertically displaceable (Continued)

housing which, in the upper position, accommodates a mold and a perforated horizontal pipe which releases jets of heated fluid against the mold cups.

8 Claims, 4 Drawing Sheets

(51) Int. Cl.
    *A23G 9/18*     (2006.01)
    *A23G 9/26*     (2006.01)
    *A23G 9/50*     (2006.01)

(52) U.S. Cl.
    CPC .......... *A23G 9/503* (2013.01); *A23G 2200/00* (2013.01); *A23G 2220/12* (2013.01)

(56) References Cited

U.S. PATENT DOCUMENTS

| | | | | |
|---|---|---|---|---|
| 3,024,622 | A * | 3/1962 | Gram | A23G 9/10 |
| | | | | 62/340 |
| 3,468,265 | A * | 9/1969 | Otken | A23G 9/282 |
| | | | | 425/117 |
| 3,535,889 | A * | 10/1970 | Carlo | A23G 9/503 |
| | | | | 62/345 |
| 5,447,036 | A * | 9/1995 | Heinrich | A23G 9/26 |
| | | | | 425/126.2 |
| 5,568,729 | A | 10/1996 | Heinrich et al. | |
| 2015/0342216 | A1 * | 12/2015 | Henriksen | A23G 9/225 |
| | | | | 425/135 |

FOREIGN PATENT DOCUMENTS

| | | |
|---|---|---|
| GB | 1091492 A | 11/1967 |
| KR | 101547223 B1 * | 8/2015 |
| KR | 20150095438 A | 8/2015 |

OTHER PUBLICATIONS

International Preliminary Report on Patentability, International Patent Application No. PCT/BR2018/050201, dated Apr. 11, 2019, with English translation (34 pages).

Abstract of Aittomaki, "Potassium formate as a secondary refrigerant", International Journal of Refrigeration, vol. 20, No. 4, Abstract, pp. 276-282., 1997 (1 page).

\* cited by examiner

CIRCULAR EQUIPMENT WITH AUTOMATIC UNMOLDING FOR POPSICLE PRODUCTION AND METHOD FOR POPSICLE PRODUCTION

FIELD OF THE INVENTION

The object of the present invention is a practical and innovative machine to produce popsicles, a cooling substance and a method to use thereof, pertaining to the field of industrial food production equipment, to be used more precisely in the production of ice cream on sticks, popularly known as popsicles.

The object of the present patent application includes an automated equipment, with a tank having a circular geometry, and an automatic unmolding device inside it. The object of the invention includes also a freezing fluid and its formulation.

SUMMARY OF PRIOR ART

As is well known, notably by those skilled in the art, popsicle-making machines have a tank provided with a low temperature fluid which, when agitated heavily, freezes the popsicle mixture into stainless steel molds immersed in that fluid. Such fluid is maintained at low temperatures (−20 to −35° C.) by means of copper coils inside this tank or heat exchangers that are normally placed at the bottom of the equipment below the tank where there are also: refrigeration compressor, centrifugal pump for fluid circulation/agitation and other components of the refrigeration system.

During this process, sticks are inserted that will be attached to the popsicles as they pass from the liquid to solid phase.

After freezing, the molds are removed from the freezing tank and inserted into a tank with hot water so that the popsicles are detached from the mold walls (a process called unmolding) and extracted from that for later packaging.

Most of the equipment for the production of popsicles use the same concept for decades. The variation is the type of freezing fluid, which may be alcohol, brine (sodium or calcium chloride) or propylene glycol; its agitation system, which can be made by propellers or circulation pumps and, finally, the manner the molds move inside the tank, which can be linear, circular or oval.

The market for these machines is divided into artisanal, semi-industrial and industrial. The first consists of lower cost equipment with manual operation, while the second includes partial automation and the third full automation of all steps described above at increasing costs.

More specifically, the artisanal machine, which produces about 200 to 1000 popsicles per hour, is made up of a compact structure with vertical rectangular prismatic geometry, made of common stainless steel with internal cooling, heat rejection and pumping units. It has open operation (freezing fluid exposed to the atmosphere).

Regarding the mold and freezing of popsicles, there is a 40-liter immersion tank of propylene glycol or alcohol at −20° C. or −25° C. and unmolding at +50° C. Popsicles are frozen by propylene glycol or alcohol, which circulates by centrifugal pump.

Ingredients are manually poured into the molds, which are removed from the cold tank and dipped into the hot tank for manual popsicle extraction and the molds are washed out of the machine.

The semi-industrial equipment, whose production is of the order of 2000 to 8000 popsicles per hour, consists of a cabinet of linear geometry, of average dimensions in common stainless steel with internal cooling and pumping system and external heat rejection. It has open operation (freezing fluid exposed to the atmosphere).

The molds are the same as the artisanal one, but pushed step by step on rails in a 400-liter propylene glycol or alcohol immersion tank at −20 or −25° C., which freezes the popsicles circulating them by centrifugal pump.

Regarding the process, the molds go through fixed dosing/sticking stations and are manually dipped in a hot tank for popsicle unmolding and extraction. Said molds are washed off of the machine.

The industrial machines, whose production is over 8000 popsicles per hour, are made up of a bath tunnel integrated with a turntable and have large dimensions, with external cooling systems, heat rejection and freezing fluid pumping. Made of special stainless steel with closed operation (freezing fluid confined below the turntable).

They present molds in turntable immersed in 2000 liters of −35° C. Calcium Chloride solution, which circulates by centrifugal pump and freezes the popsicles. It has hot jet unmolding system under the molds.

The table rotates in steps and fixed stations dose the ingredients, insert sticks and extract the popsicles, going into a chocolate bath in a tunnel. The molds are washed manually on the table itself.

The equipment proposed here is dedicated to the semi-industrial market and is intended to replace the current linear machines.

Among the known systems of the prior art those described in U.S. Pat. No. 5,447,036 can be mentioned which utilizes a mold holder turntable, which are arranged in several sectors.

GB1091492A discloses a system utilizing a toroidal channel to which a circular mold holder is provided with mold filling means and intermittent rotary movement mechanism of said mold holder.

State of the art equipment have several drawbacks, which will be discussed below.

The automated equipment known as the rotary popsicle producer has all automated production steps, including the unmolding process, but its cost is extremely high.

Some aspects of such equipment related to linear semi-industrial machines are presented below:

The stainless steel "plate" containing the popsicle molds is made integrally or separately into circumference sectors, and the popsicle cups are welded either directly to these sectors or to the integral "plate". This causes a major joint strain after welding and there are only two reliable suppliers of these plates worldwide at exorbitant prices.

Artisanal-like molds used in artisanal and semi-industrial machines are made in a standardized manner by various suppliers and are significantly lower in cost, as they are independent parts with about 28 popsicles each. Unlike with industrial machines where the turntable system eliminates any contact of freezing fluid with popsicles, in semi-industrial machines that use artisanal molds the tank fluid is exposed in the space between adjacent molds and handling and movement of the molds always ends up splashing fluid into them, configuring a process not very sanitary, besides contaminating the popsicles' ingredients.

Due to the weld of hundreds of cups to the same stainless steel base with large thickness at rotating machines (to minimize bending after welding), their weight is exaggerated and this forces manufacturers to support this large disc in a reinforced central bearing, with a quite high cost.

The popsicle cups are welded to the plate with their larger side radially, to facilitate automatic extraction, subsequent chocolate bath and placement of popsicles into automatic packers. This causes a waste of space between popsicles, significantly increasing the amount of freezing fluid below them, forcing the freezing tank to be significantly larger in volume. The freezing tank of such machines is at least three meters in diameter as a result.

The artisanal molds, in turn, are mounted with the popsicles with their larger side inverted (relative to the industrial machine plate), side by side and very close, leaving a small volume to be occupied by the coolant. This makes difficult the automatic extraction, subsequent chocolate bathing and dispensing of popsicles in line with packaging machines, as this "box" mold model (each box has an average of 28 popsicles) is designed to be inexpensive and cost-effective and manually used.

The operational temperature of the freezing fluid in industrial machines is between −30° C. and −35° C., so that the popsicles are extracted very consistently and withstand subsequent chocolate baths (sometimes more than one). At these very low temperatures, the only low-cost freezing fluid existing, which maintains viscosity low enough to be agitated by centrifugal pump, is the calcium chloride solution with water. Extremely corrosive, such solution requires all stainless steels to be special and considerably more expensive than conventional steels, including popsicle molds, which are also thicker; even so, the durability of the components, especially the centrifugal pump, is quite limited. Although the solution used is low cost, the required volume is very large and the operational cost, due to the wear generated, becomes very high, which is why this type of equipment is only viable for productions above eight thousand popsicles per hour.

Semi-industrial machines use alcohol or propylene glycol as freezing fluids, but the former works well up to −25° C. and the second to −20° C. only, temperatures below which viscosities increase greatly and the centrifugal pump can no longer promote the agitation necessary for the freezing of popsicles, considerably slowing the production. The use of calcium chloride in these machines would quickly wipe out the stainless steels used in them as they are common and thin (low cost). For this reason, popsicles extracted from this type of equipment usually need to be sent to a freezer for a few hours before undergoing any chocolate bath.

SUMMARY OF THE INVENTION

With the purpose to promote a significant advance in semi-industrial popsicle production equipment and to solve the drawbacks above mentioned, the proposed invention uses a circular freezing tank, more precisely with a toroidal-shaped channel, on which a rotary mold holder mold is supported that is intermittently moved by a stepper motor positioned in the center of the structure that makes up the freezing tank. Contrary to the usual in industrial machines, this mold holder does not have the popsicle cups welded in its structure. This configuration solves the wasted space between popsicles, substantially reducing the amount of freezing fluid below them, and has a reduced weight compared to prior art models.

More specifically, the present invention uses a concept of rotatory plate associated with conventional elongated rectangular shaped removable molds. The rotatory plate presents an innovative configuration that allows the use of conventional and inexpensive molds of the type used in linear machines. This concept solves the drawbacks of molds moving on machines using linear systems by employing a mold holder configured as a rotatory plate, compared to industrial systems which do not use standard molds and are very costly to construct.

In this configuration the molds are fed by heads mounted on structures with wheels that can be positioned next to the freezing tank near its outer perimeter. The molds are moved by the rotatory mold holder as they are filled.

Inside the freezing tank there is provided an unmolding station comprising a device formed by a radially positioned substantially parallelepipedic niche 29 into which a movable box moves vertically, said device eliminating the manual process of removing the mold and dipping it into a hot water tank, as in linear machines.

To solve the drawbacks related to the freezing fluids used so far, an innovative freezing fluid formula and method of application has been developed, which will be detailed below.

DESCRIPTION OF THE DRAWINGS

In addition to the present description in order to gain a better understanding of the features of the present invention and in accordance with a preferred practical embodiment thereof, a set of figures follow the description, in which, by way of example, without limitation, the following has been represented.

DETAILED DESCRIPTION OF THE INVENTION

As illustrated by the above figures, the CIRCULAR EQUIPMENT WITH AUTOMATIC UNMOLDING FOR POPSICLE PRODUCTION AND METHOD TO PRODUCE POPSICLES, object of the present invention, is essentially composed of a freezing tank (1) in the form of a double-walled toroidal channel (1A, 2) internally flanked by a circular trough-shaped spillway (5), adjacent to the inner wall of the inner channel (1A), said spillway (5) being connected to a fluid suction duct (6), the structure comprising both is made of fiberglass, with an outer shell (2), also made of fiberglass, containing expanded polyurethane as rigid thermal insulation (3) between them. The "sandwich" comprising the two fiberglass parts (1A, 2) and the polyurethane have sufficient rigidity to support the weight of the freezing fluid that will fill in said inner channel of the freezing tank (1), where the molds are immersed (9) as well as to ensure flatness to accurately accommodate and rotate the mold holder plate (7).

Said toroidal freezing tank (1) is supported by a rigid structure (20) of profiles or angles laterally lined with stainless steel plates (21). In the center of such structure is provided the stepper motor (12), visible in FIG. 6, whose axis is connected to the traction disc (8), in which the periphery of the sectors (7D) are coupled which together form the mold holder plate (7), whose outer perimeter is supported by rollers (11) installed at the top of the outer wall of the tank structure (1), the traction disc (8) being equally supported on rollers positioned at the top of the inner wall of the tank (1).

The mold holder plate (7) is comprised of a circular crown-shaped planar structure comprising a plurality of sectors (7D) with rectangular openings (7C) radially arranged in which the popsicle molds (9) are engaged.

At the bottom of the freezing tank (1) there is a freezing fluid tubular distributor (4) consisting of a rigid tube provided with multiple angled holes (19). Said distributor (4) is fed by the freezing fluid under pressure provided by the connection to a centrifugal pump (35) seen in FIG. 6. Freezing fluid jets from these holes cause turbulence in the fluid contained in the freezing tank, improving the efficiency of heat transmission.

Inside the freezing tank (1) there is a unmolding device comprising a substantially parallelepipedic niche (29) in which is housed a vertically displaceable housing (40) which, in its elevated position, accommodates within it a popsicle mold (9).

Figure 5:
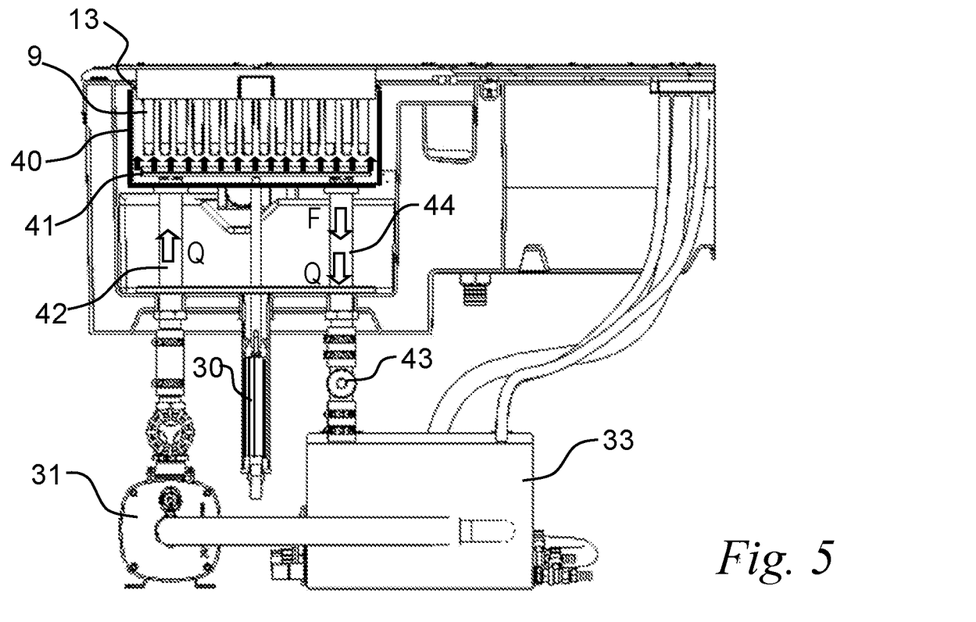
FIG. 5 is a cross-sectional view detailing the unmolding device, in which the box structure can be seen in its highest elevation position to accommodate the popsicle mold therein.

As shown in FIG. 5, the bottom of the housing is coupled to an elevator piston (30) vertically positioned under the freezing tank, the pass over its bottom.

Figure 3:
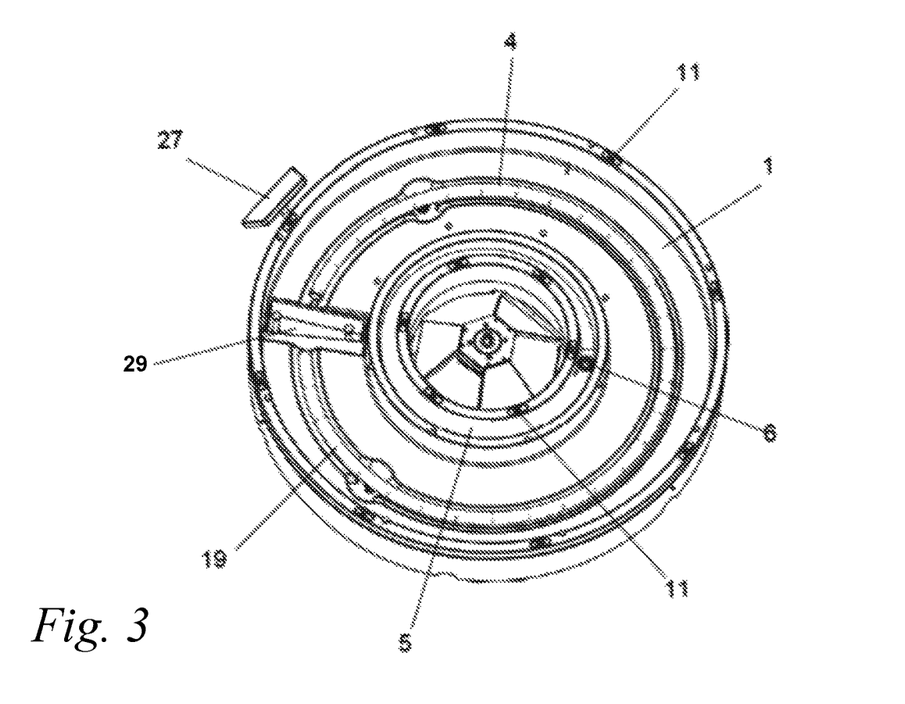
FIG. 3 is a top view of the freezing tank showing the tank-shaped niche (29) that integrates the unmolding station as well as the freezing fluid dispensing tube (4) accompanying the bottom contour of the toroidal freezing tank as well as the circular trough spillway (5) whose threshold (5A) referenced in FIG. 4, keeps the freezing fluid level constant.

FIG. 3 shows the top view of the tank with a niche (29) to accommodate the unmolding device, in addition to the fluid distributor (4) and its angled holes (19), the trough-shaped spillway (5) adjacent to the inner wall of the toroidal channel-shaped freezing tank and rollers (11), detailed below.

The cost of fiberglass construction is greatly reduced compared to conventional stainless-steel tanks, as well as allowing for recessing details, engaging accommodations and rounded (more hygienic) angles, virtually impossible to do be done with welded stainless-steel plates.

Freezing Fluid Blasting

Inside the freezing tank (1) a freezing fluid distributor (4) is positioned below the molds (9), consisting of a stainless-steel tube with small angled holes (19) so that under the action of a centrifugal pump (35) shown in FIG. 6, this fluid is released under pressure in the form of jets against each popsicle mold (9) above them, promoting fluid agitation and consequent rapid freezing of the popsicles.

The arrangement of the blasting holes (19) is designed in such a way that all popsicles of each mold (9) are frozen evenly, allowing equal amounts of pasty fillings to be inserted into the center of each popsicle (around the wooden stick), since this is the region where freezing occurs last (popsicle freezing occurs from the mold wall to its center, where the stick is located). If the popsicles freezing is not uniform, a popsicle will have more or less space in its core to accommodate the filling when compared to another popsicle.

Fluid Lung and Constant Level Spillway

The pumped and blasted fluid under the popsicle molds (9), in turn, is drained over the threshold (5A) of the spillway (5), said threshold being associated with the inner wall of the freezing tank in shape of toroidal channel. The function of this threshold is to ensure that the level (N.L.) of the freezing fluid in the freezing tank (1) is kept constant to ensure that the popsicle molds (9) are always 100% bathed.

Said spillway (5) also has the function of lung (stock) of fluid, whose main advantage is to enable the partial or full replacement of popsicle molds (9) with larger or smaller immersed volume (popsicles with larger or smaller size) with no need to manually adjust the fluid level so that all molds are immersed at the appropriate level which corresponds, as already mentioned, to the threshold (5A) of the trough-shaped spillway (5).

Part of the molds can also be worked for smaller productions, leaving voids in the mold holder plates (7) which are provided with lids for this case and the freezing fluid level is automatically adjusted to cover the molds present in proper height. Evaporation or other fluid losses over long periods of operation are also automatically compensated by this lung, always keeping the freezing tank level constant.

Such a construction is not present in any linear semi-industrial equipment on the market. In linear machines the operator needs to visually control the fluid level, both for replacing molds with molds with different volume, and for replacing losses due to evaporation and handling, considerably larges because it is an open system.

The spillway (5) is constructed with an inclined bottom so that the freezing fluid is carried to its lowest point, where the circulation pump suction duct (6) is located. The repression of such pump forces fluid to pass through a heat exchanger (36) shown in FIG. 6, and then leads it back to the fluid distributor (4).

Rotatory Mold Holder Plate

On the freezing tank (1) is placed the circular crown-shaped mold holder plate (7), consisting of circular sectors (7D) with cut-outs (7C) for precise engage of each popsicle mold (9) and internal (10) fasteners molds and external fasteners molds (unreferenced). These sectors can be made of plastic (machined, molded or fiberglass laminated) or even of thin stainless steel. The rotomolded alternative can be filled with polyurethane inside of it, configuring a thermal insulation that prevents condensation of water on the plates. The machined plastic alternative of adequate thickness also has this advantage.

Below these plates there are rollers (11) attached to the freezing tank that allow the complete set of popsicle molds to be turned, moved by the traction disc (8), also made of plastic or stainless-steel, which is driven, in turn, in its center by the step motor (12). Due to the low weight of such structure, there is no need for a robust central bearing to support it, as in the state-of-the-art industrial rotary machines known. It also eliminates the need for multiple pneumatic pistons as in the "come and go" linear machines. The stepper motor (12) is electronically controlled to accurately move the mold plate according to the desired production speed at angular intervals corresponding to the distance between adjacent molds.

Cut-outs or rectangular openings (7C) to accommodate the molds provided in the mold holder plate (7) prevent one mold (9) from pushing another during the production process (which may damage the molds over time), such as in linear machines, and also close the environment of molds (9) against freezing fluid splashes, very common in open system linear machines. The system herein proposed resembles that used on the rotatory plate of known industrial machines, with the enormous advantage of allowing the removal of each mold (9) individually at any time, both for washing and for any eventuality (replacement with another mold model, maintenance, etc.).

Popsicles Unmolding

The unmolding device operates without having to remove the mold (9) and immerse it in a hot water tank as in linear machines. According to the invention, such a device comprises a stainless-steel housing (40), which is vertically moved by an elevator piston (30) within a niche (29) between a lower position and an upper position.

Prior to the unmolding operation—which starts when the stepper motor positions the mold with the frozen popsicles in the unmolding station, i.e., over the niche (29) such housing (40) is in the lower position, i.e., near the bottom of the freezing tank, being immersed in the freezing fluid (at low temperature) and filled with it.

At the beginning of the unmolding cycle, an elevator piston (30) elevates said housing, guided by a first tube (42) and a second tube (44), which pass through the outer wall (2) of the toroidal canal (1) to which they are rigidly fixed. Upon reaching the maximum elevation position, said housing accommodates within it the frozen popsicle mold (9), being connected and in communication with the ends of said first and second tubes, as symbolized by the arrows (Q) in FIG. 5.

Figure 4:
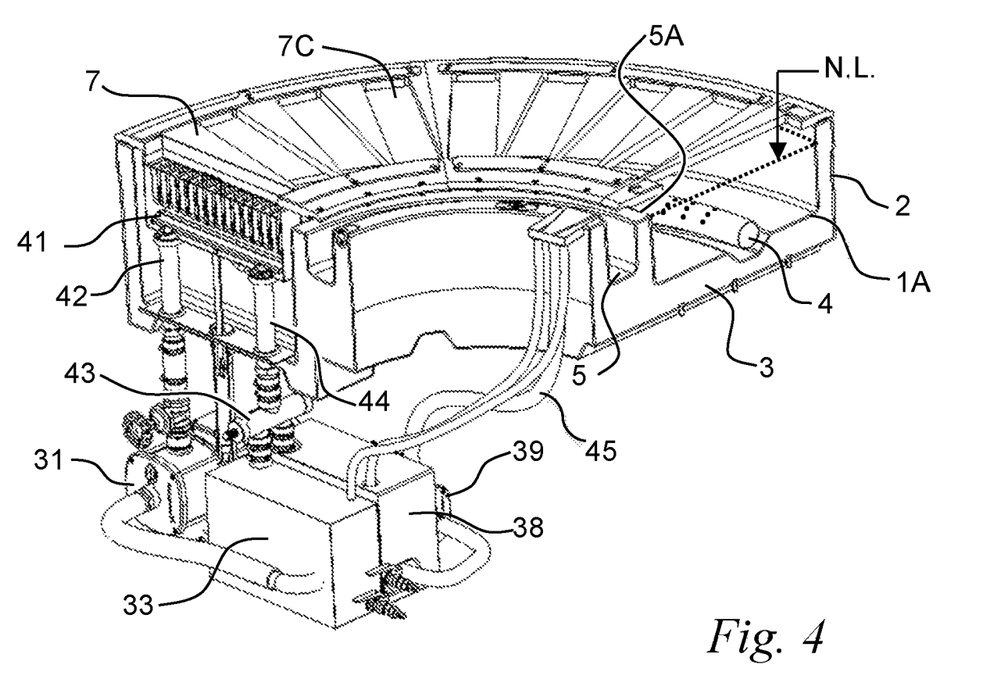
FIG. 4 shows a top perspective sectional view of area relative to the equipment freezing tank with automatic unmolding to produce the popsicles.

The freezing fluid is then drained through the second tube (44) as indicated by the arrow (F) in FIG. 5, to a solenoid valve (43) which, through a first outlet, sends such fluid to a cold tank (38). A pump (39) associated with said tank as shown in FIG. 4 sends this fluid to the trough/lung (5) which functions as a freezing fluid reservoir.

Then, another pump (31) is driven, sending, under pressure, the heated fluid contained in the tank (33) to the first tube (42), as symbolized by the arrow (Q) in FIG. 5. Said tube introduces such fluid into a horizontal pipe (41) provided with a plurality of upwardly directed perforations through which hot fluid is released like jets reaching the mold cups (9). The use of such jets, symbolized in FIG. 5, by small vertical arrows, increase the heat exchange efficiency, resulting in the popsicles unmolding in about 3 seconds. The jet unmolding technique has the additional advantage of dispensing housing filling with hot fluid, being used a volume equivalent to only about ⅓ of such capacity. The fluid ejected under the popsicle cups is immediately drained through the second tube (44) according to the arrow (Q).

The drained fluid is sent through a second outlet of the solenoid valve (43) to the heating tank (33) where it is heated by means of electrical resistors to be rerouted by the pump (31) to the tube (42) and the housing (40).

At the top of the mold, which is secured to the mold holder plate (7) by means of the mold fasteners (10), an operator only manually removes the extractor (9A) with the twenty-eight popsicle sticks attached to it.

At the end of the unmolding cycle, with the popsicles removed and the housing (40) completely emptied, the elevator piston (30) lowers the housing to the bottom of the freezing tank (1), where it is again flooded with freezing fluid.

Figure 6:
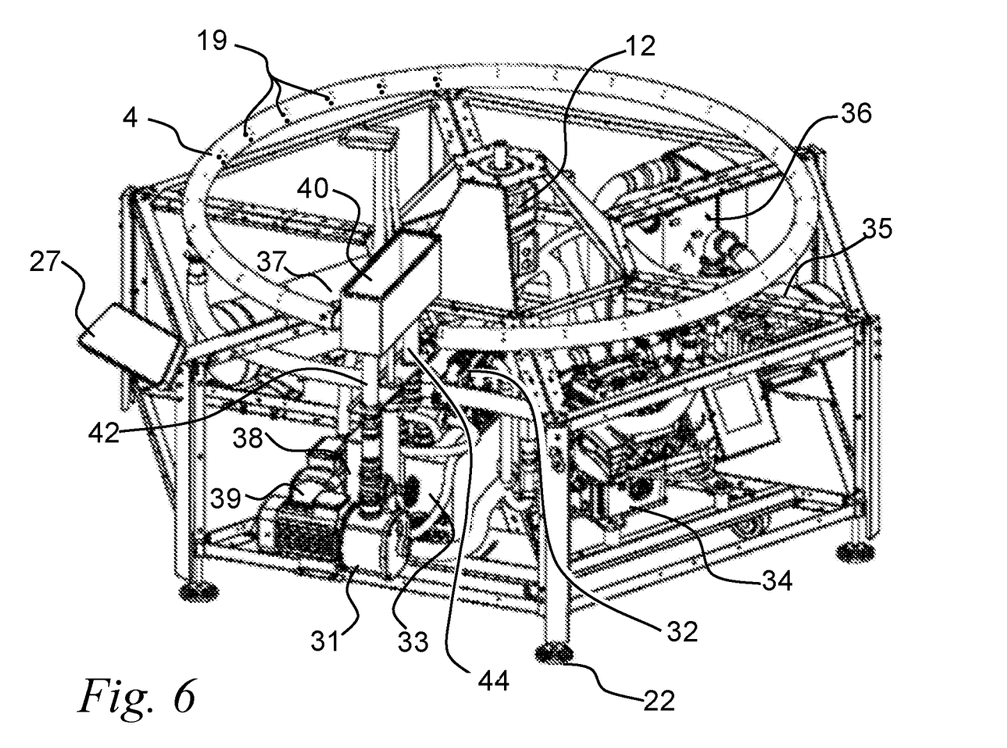
FIG. 6 shows the components of the equipment of the invention placed below the tank.

The actuation of the elevator piston (30) is by a bypass of the freezing fluid pipe associated with the freezing centrifugal pump (35), indicated in FIG. 6, taking advantage of the pressure provided by this pump, which process is also the object of the present invention. Such elevator piston drive may also be by compressed air or electric motor.

Once the housing (40) is lowered, the mold holder plate (7) is ready to rotate one more step, when another mold will be positioned in the unmolding station, and so on.

Importantly, the freezing fluid and heating fluid are the same, however working in different circuits in order to avoid thermal losses, and there is no mixing between hot and cold fluids. This separation is provided by the solenoid valve assembly and the emptying box filling and emptying system as explained above.

It should be noted that the drainage tube (44) has no hydraulic connection with the perforated tube (41). There is only one mechanical connection between them. The housing (40) is fixed to the elevator piston (30) so that it only rises and descends, while the vertical tubes (42) and (44) form a kind of "bridge" with the tube (41) attached to the bottom of the fiberglass tank.

More specifically, the valve (43) positioned at the bottom of the tube (44) shown in FIG. 4 directs the drained fluid into separate tanks, one for hot fluid (33) and one for cold fluid (38), which are placed at the bottom of the equipment. The cold fluid tank has a small pump (39), which sends this fluid back to the machine's lung tank (5) via the tube (45). The hot fluid tank (33) has another pump (31) for hot jetting under the mold (9) through the tube (42), returning to the same tank through the tube (44). Inside the hot tank (33) there are electric resistors positioned to heat the fluid again.

The unmolding housing has an approximate internal volume of 10 liters, enough to wrap the popsicle mold. The cold tank (38) has slightly higher volume as it receives and pumps the full volume from the unmolding box. The heating tank (33), in turn, also has an approximate volume of 10 liters but receives and pumps only 3 liters to the unmolding box, the remaining fluid being used to keep the electrical resistances always covered by fluid.

A rubber gasket (13) around the case prevents fluid jet splashes below the mold from exiting the housing and contaminating the popsicles.

Compared to the unmolding device used in industrial circular machines, which has no moving parts, it appears to be disadvantageous in adopting up and down means to unmold the popsicles. However, the configuration adopted results in high energy efficiency as it uses only 3 liters of hot fluid to unmold 28 popsicles, while industrial machines use about 20 liters of heated fluid for every 10 popsicles. The space occupied by the mold assembly proposed by the invention is about ⅓ of the space occupied by the industrial machinery unmolding assembly. The final cost is much lower in the solution herein proposed, since the operation of industrial machines, so that the unmolding system has no moving parts, requires tanks and other apparatus of difficult construction and operation.

Equipment Structure

Figure 7:
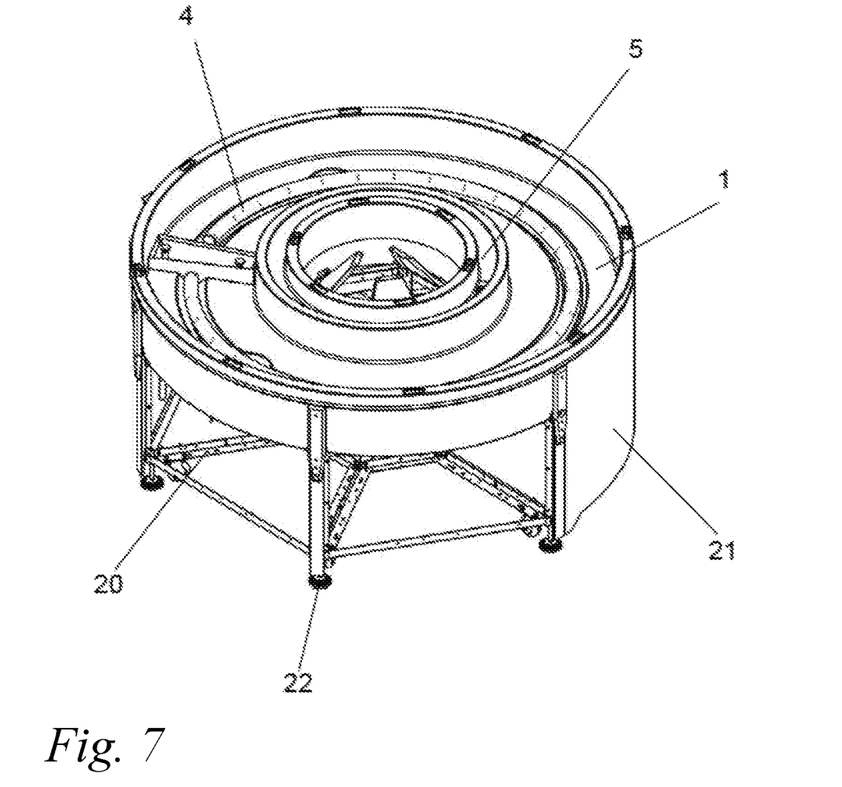
FIG. 7 shows a support structure (20) formed by a set of bolted angles supporting the freezing tank (1). Around the assembly are placed lining plates (21), usually of stainless steel. At its bottom there are wheels to move the equipment as well as shoes (22) with adjustable heights for correct leveling.
Figure 8:
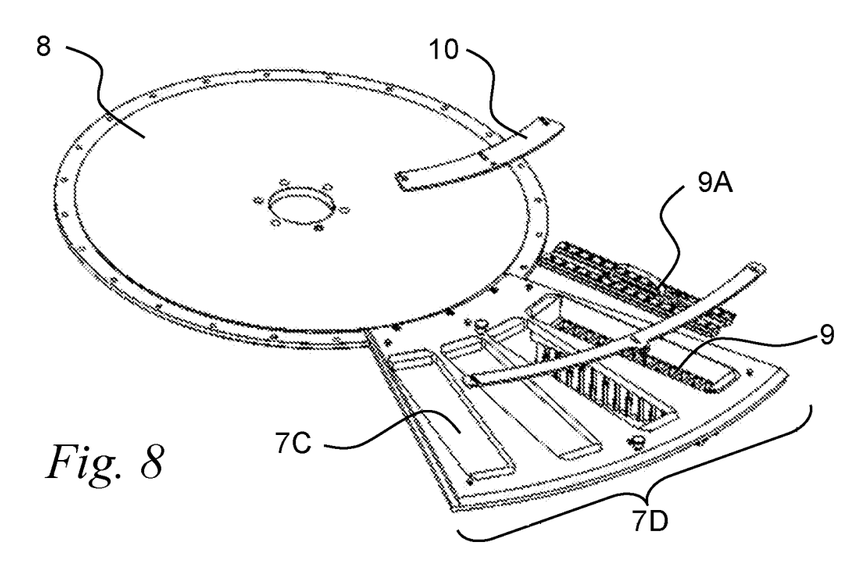
FIG. 8 is a detailed view of one of the sectors that constitute the mold holder, and its relationship to the traction disc, which is driven by a stepper motor (not shown in this figure).

FIG. 7 shows a set of bolted angles (20) on which the freezing tank (1) is supported. Around the assembly plates (21) are placed, made of stainless steel as a lining. In its lower part there are wheels for equipment movement as well as shoes (22) with adjustable height for its correct leveling.

Dosers

Figure 1:
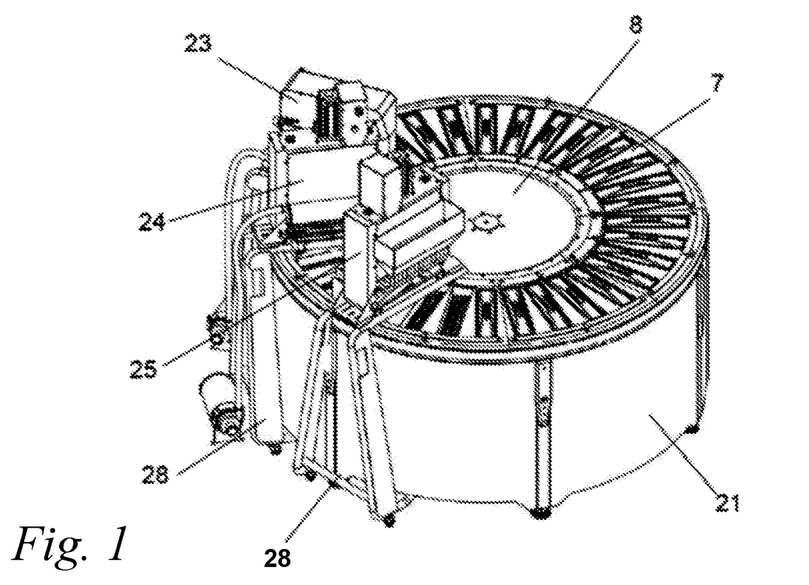
FIG. 1 shows a top perspective view of the automatic unmolding equipment of the invention to produce popsicles.
Figure 2:
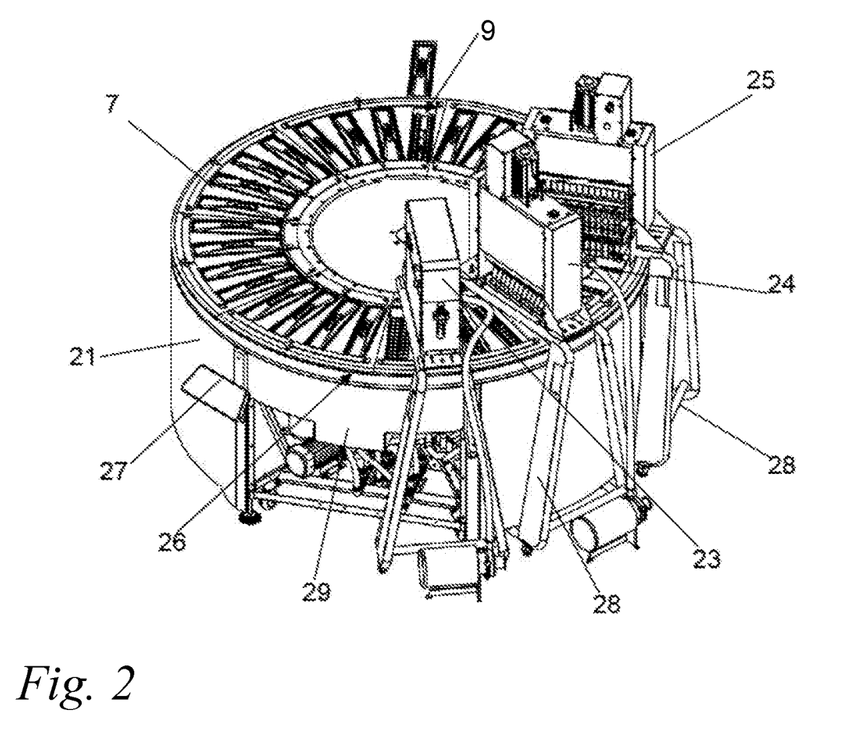
FIG. 2 shows a top perspective view of the automatic unmolding equipment of the invention to produce popsicles, wherein the niche (29) is seen in the tank where the unmolding is installed.

In FIG. 2 is shown the niche (29), which accommodates the unmolding device where the movable housing is accommodated. On the left side of this niche the equipment control panel (27) is located.

As shown in FIG. 2, at the stations following the unmolding, dosers for liquid (23), particulates (24) and fillers (25) can be positioned, and a stick placer, not shown in the figure, similar to what is done today in linear machines.

Each doser is accommodated on movable structures (28) provided with wheels in order to facilitate its positioning depending on the type of popsicle to be produced.

For example, a three-flavored popsicle may only need three liquid dosers, one for each flavor, while a more elaborate popsicle with particulates in it (such as peanuts, nuts, etc.) may require only one particulate doser and so on. Conventional semi-industrial machines accommodate the dosers on the tank, making it difficult to rearrange them depending on the type of popsicle to be produced.

Extraction of the popsicles from the molds can also be done by an automated actuator, using a rotatory arm that dispenses the popsicles directly onto the belt of a packer, or even chocolate bath systems, such as in industrial rotary machines.

Bottom Portion of the Equipment

FIG. 6 shows the assembly of devices that are positioned below the freezing tank. They are: the unmolding pump (31) that, together with the solenoid valves (32) and the hot fluid tank (33), provide pressurized hot fluid to feed the unmolding jet producing pipe (41); the control panel (27) that is connected to the electrical box to drive all devices of the machine; the refrigeration compressor (34) working in conjunction with the condenser (37) and the heat exchanger (36) to maintain the temperature of the freezing fluid at temperatures exceeding −30° C.; the centrifugal pump (35) which is responsible for circulating and blasting the fluid under the molds and freezing the popsicles, in addition to supplying pressurized fluid to drive the piston (30); the stepper motor (12) which intermittently moves the mold holder plates (7), positioning the mold with already frozen popsicles over the unmolding station and subsequent molds in the dosing stations.

The equipment has no pneumatic drives and eliminates the need for an expensive compressed air unit used in conventional machines.

The arrangement of the components within the hexagonal structure of angles is very compact, with 2.3 meters outside diameter of the equipment and 30% inferior do than conventional linear equipment.

Freezing Fluid

In a first embodiment of the invention, a freezing fluid produced by a US chemical company capable of maintaining low viscosity at temperatures below those achieved by calcium chloride was used. It is a fluid comprising paraffinic hydrocarbons, water-immiscible, non-corrosive and very low in evaporation, and has excellent thermal properties at low temperatures. The high cost of such fluid is compensated in the proposed system by the reduction of the required volume, since the freezing tank is made in order to minimize its internal volume.

Indeed, in the known art, such volume ranges from 400 to 600 liters in linear machines to about 2000 liters in industrial machines. In contrast, the system of the invention uses only 200 liters of such freezing fluid, one of its suppliers being Paratherm, which markets the fluid under the name Paratherm LR®.

Although this fluid is already known, its use in open circuit is a major innovation, as Paratherm LR® is immiscible in water. This way, any small amount of water that may be condensed inside the tank, even from the humid air in the tank, can freeze immediately as it falls into the freezing fluid, forming ice flakes that often block the equipment heat exchangers and often completely block fluid pumping.

To address this problem, the inventor added, after thorough research and testing, 5 to 10% of a low freezing hygroscopic substance, such as propylene glycol or alcohol, to Paratherm LR®. Although propylene glycol also does not mix with Paratherm LR®, it is used to absorb any water droplets that may fall into the freezing fluid as it is miscible with water.

When pumping begins, an emulsion is formed between Paratherm LR® and propylene glycol, separating completely after a few hours of pump shutdown; propylene glycol occupies the bottom of the tank and can thus be easily drained when saturated with water.

This mixture and the way it is used is also the object of the present invention, since, besides being innovative, it has great advantages, emphasizing that the formulation of Paratherm LR® is not presented, as it is a commercial product and its formula is not is made available by the manufacturer.

Advantageously, said hydrocarbon-based fluid can be replaced by a saline solution that does not attack stainless-steel or most materials, as with calcium chloride used in conventional industrial machines. It also does not harm polymers, as with Paratherm.

It is the potassium formate ($KHCO_2$) mixed with deionized water, in a weight ratio of 30 to 60% potassium formate, to which anti-corrosive compounds that protect against specific materials such as copper and aluminum alloys may be added. Unlike Paratherm, this solution is non-flammable and is non-toxic and biodegradable (Paratherm is neither biodegradable nor 100% non-toxic). The pH range in which said solution is less corrosive ranges from 7 to 8, the pH value being adjusted by bubbling $CO_2$ or by adding controlled doses of 50% Dipotassium Phosphate.

As the machine of the invention has a tank (33) where the fluid needs to be heated to 50° C. (or more) for popsicle unmolding, potassium formate has been shown to be 100% safe, while Paratherm can be dangerous if any problem occurs in the control of the electric heating resistors and the temperature exceeds 80° C.

Controlling the density of this mixture is simple since only water evaporates from it (salt remains in the tank). The method of the invention further comprises controlling its acidity (pH), which has a direct influence on any corrosive potential of the substance. As mentioned, the range of pH values in which this solution is less corrosive is between 7 and 8.

Advantages of the Machine Built According to the Invention

The object of the present invention is therefore a rotary popsicle producer at a cost similar to or even less than linear models, eliminating all the drawbacks of the latter and overcoming the industrial rotary model in several aspects. Following is the list of advantages of the invention.

It allows working with more than one type of freezing fluid at temperatures below −30° C., using Paratherm LR®+ propylene glycol as well as potassium formate solution, which, besides the advantages mentioned above, has a cost substantially lower than Paratherm LR®.

It is constructed with common stainless-steel components as it does not employ corrosive agents such as calcium chloride. Plastics of various types can also be used in its construction.

The rotary mold plate, due to its lightweight, can be driven by a single actuator, with less power than semi-industrial linear machines and industrial rotary machines.

As with industrial rotatory machines, there is no direct contact of the popsicles with the freezing fluid, as it is below the rotatory disk, which in turn hermetically accommodates each of the molds in their engages.

The mold engaging system eliminates intense evaporation of the freezing fluid as it circulates indoors and not open as in conventional linear machines. In addition, the plastic material and thermal insulating drastically decreases the absorption by the freezing fluid of condensed water from the ambient air, such water increases the viscosity of the fluid in a short time and decreases the speed of popsicle production.

The present invention allows for easy positioning of the dosing units, since they are accommodated on independent mobile supports and not on the tank, as in conventional linear machines.

It is very easy to remove each mold from the machine at the end of the day to be washed in industrial dishwashers with hot water, detergents and sanitizers in a 100% safe and practical process. On industrial machines an operator literally needs to climb onto the rotatory plate and wash the molds with a water hose in a rather rudimentary process, then suck or blow out the remaining water in the popsicle molds with compressed air.

By utilizing standard, low-cost commercial molds, changing popsicle shapes (there are several models offered by mold producers) is also greatly facilitated. On industrial machines the entire mold holder plate needs to be changed when making popsicles of other shapes in an operation that requires at least one working day.

There is no need to remove the molds from the freezing tank for them to be immersed in a hot water tank, as in the system of the invention the unmolding device is placed in the freezing tank itself, as already explained, with the advantage of using the same fluid used for freezing, although heated. Conventional linear machines, by using water in the unmolding tank, cause the molds to bring water droplets into the freezing tank, which eventually saturates the alcohol or glycol therein present, increasing the viscosity of the mixture and significantly decreasing the speed of production. Normally, in linear machines, it is necessary to completely replace alcohol or propylene glycol every 15 days of continuous work.

There is no need to adjust the freezing fluid level visually, constantly and manually, as with conventional linear machines, as the circular channel spillway system (5) does this automatically, even when popsicle molds of different volumes are placed or the machine works with fewer molds than the maximum allowed for smaller productions.

The proposed machinery according to the invention can also work with propylene glycol in the freezing tank if the producer prefers or does not have access to Paratherm LR® or Potassium Formate, but operating temperatures must not be below −20° C. The evaporation of propylene glycol in this machinery is significantly reduced, as well as the absorption of moisture, as it works indoors by the rotatory mold holder plate and not in open environment as with conventional linear machines.

The present invention does not use compressed air units to drive rotatory plate or unmolding system. Dosing units can also be supplied with electric and non-pneumatic drive. Machines available on the market, whether semi-industrial or industrial, require the use of compressed air for their operation.

While the present invention has been described in connection with a preferred embodiment, it should be understood that modifications may be made with respect to certain details of construction and shape without departing from the fundamental principles of the invention.

Thus, it is intended to cover all possible alternatives, modifications and equivalents within the spirit and scope of the invention as defined in the following set of claims.

The invention claimed is:

1. Equipment with automatic unmolding for popsicle production, comprising a toroidal channel-shaped freezing tank containing coolant liquid, to which a rotating mold holder is superimposed, wherein said mold holder is shaped like a circular crown formed by joining a plurality of sectors affixed to the periphery of a traction disc driven by a stepper motor, said sectors comprising rectangular openings radially arranged wherein the molds engage a lower portions of the molds being immersed in said coolant whose level is that of the threshold of a trough-shaped spillway constituting a lung where the coolant liquid is stored, said spillway being associated with an inner wall of the toroidal channel freezing tank at a bottom of which there is a rigid pipe which is provided with a plurality of radial holes oriented in several angled holes whereby jets of pressure coolant are released under pressure, and by providing a unmolding device comprising a parallelepipedic niche radially oriented within said freezing tank containing a vertically displaceable housing accommodating therein a mold when in a upper position, as well as a horizontal pipe provided with upwardly directed holes through which unmolding hot fluid jets are released against mold cups, said fluid being drained and returned to a heating tank.

2. The equipment according to claim 1, wherein the said toroidal channel has a double wall forming a sandwich where a space between said walls are filled with a rigid thermal insulator.

3. The equipment according to claim 1, wherein the housing, when in the upper position, is connected to a first tube through which an unmolding hot fluid, supplied by a pump connected to the heating tank is routed to said horizontal pipe.

4. The equipment according to claim 3, wherein means for drainage of the unmolding fluid is provided by a second tube in communication with the bottom of said housing, said pipe having its lower end connected to a valve with outlets for a cold tank and for the heating tank.

5. The equipment according to claim 1, wherein means for drainage of the unmolding fluid is provided by a second tube in communication with the bottom of said housing, said pipe having its lower end connected to a valve with outlets for a cold tank and for the heating tank.

6. Method for popsicle production in which a plurality of molds are arranged radially in a rotary mold holder supported by rollers in a toroidal channel-shaped freezing tank and which displacement is made intermittently by a stepper motor, said molds being immersed in a freezing fluid within the said tank, wherein said method comprises: (i) pouring, using distributors, ingredients into the molds; ii) freezing said ingredients by contacting the molds with agitated freezing fluid, where the level of said fluid is kept constant by means of a trough-shaped spillway, whose threshold is associated with an inner wall of said toroidal channel, said agitation being provided by blasting said fluid through angled holes provided in a tubular distributor placed below said molds; iii) unmolding the popsicles in a unmolding device, wherein the unmolding step comprises the following steps: —positioning, by means of the stepper motor, the mold over an unmolding station; —driving a piston to raise a housing, initially at a bottom of the tank, to an upper position, accommodating the mold therein with frozen popsicles; —draining the freezing fluid contained in the housing through the tube and valve, forwarding said fluid to a cold tank; —pumping the freezing fluid from the cold tank to the spillway; —driving a pump connected to a heated tank by sending heated fluid through the tube to a perforated horizontal pipe which releases jets of said heated fluid against mold cups; —draining the heated fluid through the pipe and valve into the heated tank; —extract the popsicles by manually removing an extractor to which popsicle sticks are attached; —return the housing to the bottom of the freezing tank and turn the rotary mold holder in one step.

7. The method according to claim 6, wherein said freezing fluid comprises a mixture of a liquid containing hydrocarbon paraffin with a hygroscopic substance.

8. The method according to claim 7, wherein said hygroscopic substance is selected from a group comprising alcohol and propylene glycol.

\* \* \* \* \*